June 30, 1925.
A. S. JONES
WELL CASING WRENCH
Filed April 28, 1922
1,544,457
2 Sheets-Sheet 1
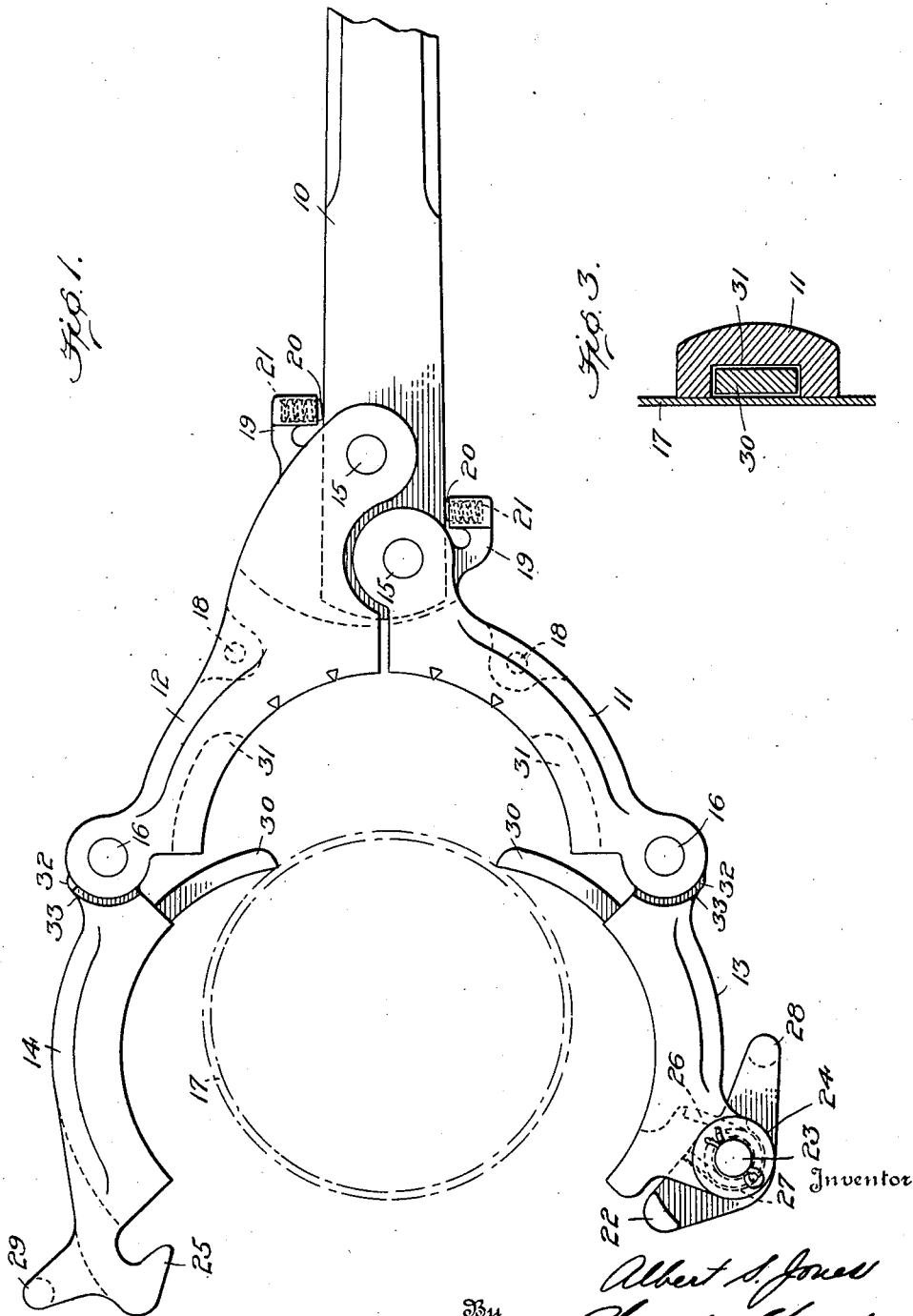

June 30, 1925.
A. S. JONES
WELL CASING WRENCH
Filed April 28, 1922
1,544,457
2 Sheets-Sheet 2
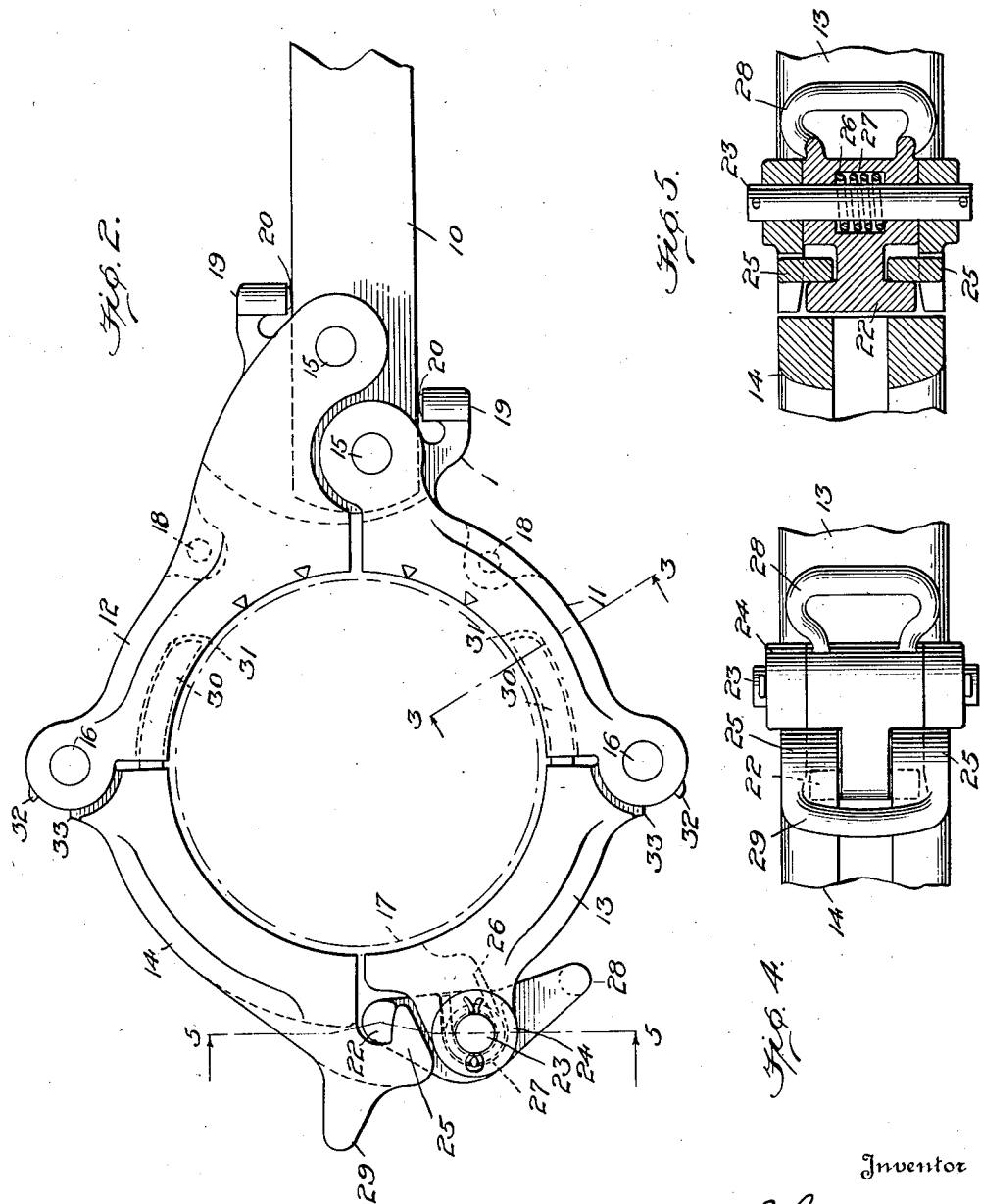

Patented June 30, 1925.

1,544,457

UNITED STATES PATENT OFFICE.

ALBERT S. JONES, OF CHATTANOOGA, TENNESSEE, ASSIGNOR TO LUCEY MANUFACTURING CORPORATION, OF NEW YORK, N. Y., A CORPORATION OF TENNESSEE.

WELL-CASING WRENCH.

Application filed April 28, 1922. Serial No. 557,084.

*To all whom it may concern:*

Be it known that I, ALBERT S. JONES, a citizen of the United States, residing at Chattanooga, in the county of Hamilton and State of Tennessee, have invented certain new and useful Improvements in Well-Casing Wrenches; and I do hereby declare the following to be a full, clear, and exact description of the same, reference being had to the accompanying drawing, forming part of this specification.

This invention relates generally to wrenches and more particularly to tools known as well-casing tongs for connecting and disconnecting sections of well-casing.

Due to their massive construction, well-casing tongs are more or less inconvenient to handle in applying them to the casing, and an object of the present invention is to facilitate the application of the tongs to the casing section by forming the work engaging members of a plurality of pivoted gripping jaws, one or more of which are adapted to be opened on their pivots to allow the casing to be inserted in the tongs, and providing means that will automatically close the gripping jaws around the casing when the tool is applied to said casing. Tongs of such construction are easily handled by a single operator who has only to set the jaws open and then push or shove the suspended tool against the casing, whereupon the jaws will be closed and, by means of a spring actuated latch, locked around the casing.

A further object is to provide a tong whose center of gravity will remain substantially coincident with its longitudinal center regardless of the positions assumed by the pivoted jaws, thereby further increasing the ease with which the tool may be manipulated.

With these and other objects in view, the invention consists in certain novel features of construction and the combinations and arrangements of parts all as will be hereinafter described and more particularly pointed out in the appended claims.

In the accompanying drawings,—

Figure 1 is a top plan view of a casing tongs illustrating the preferred embodiment of the present improvements and showing the parts in position ready for the tongs to be applied to the casing;

Fig. 2 is a similar view showing the casing enclosed within the tongs;

Fig. 3 is a sectional view on line 3—3 of Fig. 2; and

Figs. 4 and 5 are detail views of the latch for holding the jaws closed around the casing.

As illustrated, the tongs consist generally of the handle 10 and a series of gripping jaws operatively connected to the handle and adapted to be expanded and contracted to release and grip the pipe when the sections of the casing are being joined or disconnected. To secure a more perfect balancing of the tongs in order that they may be conveniently suspended in the derrick and more rapidly manipulated by the operator, there are preferably four arc-shaped gripping jaws 11, 12, 13 and 14 arranged in pairs. The inner jaws 11, 12, which are in effect levers, are opposed to each other, one on each side of the longitudinal center of handle 10 and are pivotally connected at their inner ends to said handle by pivot pins 15 at points spaced longitudinally of the handle. The outer jaws 13, 14 are also opposed to each other and similarly arranged with respect to the longitudinal center of handle 10 and are pivotally connected at their inner ends by pins 16 to the outer ends of the jaws 11, 12. The outer free ends of said jaws 13, 14 are adapted to be closed together, suitable co-operating locking means being provided on their outer ends for locking them in their closed position. Jaws 13, 14, serve primarily as connecting links for jaws 11, 12 and when the four jaws are closed they form a circular opening or bore in which the casing 17 is positioned. A lateral movement of handle 10 in one direction will first cause the jaws to contract and grip the casing while the continued movement of the handle will, of course, turn the casing.

The combined gripping faces of each pair of opposed jaws constitute a semicircle and, as will be apparent, very little movement of the inner jaws 11, 12 is necessary when the outer jaws are swung open in placing the casing in or removing it from the tongs. Jaws 13, 14 are, however, swung away from each other a considerable distance to open the tongs, but due to the four-jaw arrangement and the weight of the several parts being practically evenly distributed on opposite sides of the longitudinal center of handle 10, it results that a more or less perfect balance of the tongs at all times is secured. Suitable means such as sockets 18 for suspension bars on jaws 11, 12, and, if desired, a clevis (not shown) on handle 10 are provided for attachment of the suspension cables.

Very little movement of jaws 11, 12 being necessary, the grip taken by the jaws 11, 12 on the casing 17 may be materially aided by providing stops which serve to yieldingly urge said jaws toward each other. For this purpose comparatively heavy coil springs 20 are seated in sockets 21 formed at the handle-engaging ends of extension 19, said springs normally engaging the sides of handle 10.

While any one of various forms of latches may be utilized on the co-operating outer ends of jaws 13, 14, the preferred form illustrated comprises a latch 22 pivoted intermediate its ends on a pin 23 mounted in projections 24 adjacent the outer end of jaw 13. The latch is of T-head type and is adapted to interlock with a catch 25 formed at the adjacent end of jaw 14. A spring 26 surrounding pin 23 in a recess 27 in the body of the latch has its ends in engagement with the wall of recess 27 and the end wall of jaw 13, respectively, and yieldingly holds the latch 22 in position to automatically interlock with the catch 25, as well as in engagement with said catch, when locked. For convenience in the manual opening of jaws 13, 14 a handle 28 is formed on the outer end of latch 22 and a second handle 29 is formed near the end of jaw 14.

Heretofore, in applying the tongs to the casing, it has generally been necessary for one of the operators to manually close the jaws around the casing after the latter has been positioned in the bore of the tongs. With the present invention, however, manual closing of the jaws is eliminated by the provision of means that will automatically perform that operation, such means consisting of projections 30 carried by the outer jaws 13, 14 and adapted to be engaged and actuated by the casing to rotate said jaws on their pivots and close them as the tongs are applied to the casing. In the preferred form of construction the closing projections 30 are made integral with the jaws 13, 14 at the inner ends of the latter, said projections 30 being formed centrally of the depth of the tongs by continuing the inner gripping faces of the outer jaws beyond the pivotal centers of said jaws. The curvature of the projections conforms to that of the inner jaws 11, 12. Said projections are, of course, of less depth and width than the jaws.

As the outer jaws are opened for the insertion of the casing 17, the projections 30 will swing inwardly and be positioned substantially transversely of the bore of the tongs and, as will be apparent, when the tongs are shoved onto the casing the entering face of the casing will engage said projections and move them outwardly. This movement of the projections will automatically return the jaws 13, 14 to their closed position around the casing, where they will also be automatically locked by the spring-actuated latch mechanism heretofore described.

For accommodation of the projections 30 when a section of casing is in the tongs, recesses 31 are formed in the jaws 11, 12. As practically all strains on the tongs are laterally of the jaws the recesses 31 have little, if any, effect on the ability of the jaws to stand up under the stresses placed upon them. While other constructions and arrangements of this feature of the invention readily suggest themselves, the form described is preferable, due to its simplicity, its strength, and the small cost of production. The invention is readily applicable to the type of tongs now in general use in the oil producing industry at small additional cost.

To insure the proper positioning of projections 30 in the bore of the tongs when jaws 13, 14 are opened, co-operating stops 32, 33 are formed on the adjoining ends of jaws 11, 13 and 12, 14. This prevents the projections swinging around on their pivotal centers to a point where they will not function properly when the tongs are being placed on the casing.

What is claimed is:

1. In a well-casing tongs, the combination of an operating handle, inner opposed gripping jaws operatively connected to said handle, means for yieldingly urging said jaws toward each other, outer opposed gripping jaws pivotally mounted at their inner ends on the inner jaws, whereby said outer jaws may be opened and closed to permit the work to be inserted in and removed from the tongs, projections carried by the outer jaws, said projections extending inwardly beyond the pivotal centers of said outer jaws, whereby they will be moved into the bore of the tongs by opening the outer jaws, and means for releasably locking the outer jaws in their closed position.

2. In a well-casing tongs, the combination of an operating handle, inner opposed gripping jaws pivoted on the handle, outer opposed gripping jaws pivotally connected to the inner jaws, whereby said outer jaws may be opened and closed for work to be inserted in and removed from the tongs, integral projections of reduced width formed by continuations of the gripping faces of the outer jaws, said projections being extended inwardly beyond the pivotal centers of the outer jaws and movable into the bore of the tongs by an opening movement of said outer jaws, there being recesses for said projections in the gripping faces of the inner jaws, and means for releasably locking the outer jaws in closed position.

3. In a well-casing tongs, the combination of an operating handle, a pair of inner opposed gripping jaws pivotally mounted on the handle, a pair of outer opposed gripping jaws pivoted on the inner jaws and adapted to be opened and closed to permit work to be inserted in and removed from the tongs, means for automatically closing the outer jaws upon insertion of the work in the tongs, said closing means being movable into the bore of the tongs by an opening movement of the outer jaws, means for limiting the opening movement of said outer jaws, and means for releasably locking the outer jaws in closed position.

4. In a well-casing tongs, the combination of an operating handle, a pair of inner opposed gripping jaws pivoted on the handle and movable towards and away from each other, means for yieldingly urging the jaws towards each other, means for limiting the movement of said jaws away from each other, a pair of outer opposed jaws pivoted to the inner jaws and adapted to be opened and closed to permit the work to be inserted in and removed from the tongs, the jaws of each pair of opposed jaws being positioned on opposite sides of the longitudinal center of the operating handle, and means for releasably locking the outer jaws in their closed position.

5. In a well-casing tongs, the combination of an operating handle, a pair of inner opposed gripping jaws pivoted on the handle, means for yieldingly urging the jaws towards each other, means for limiting the movement of said jaws away from each other, a pair of outer opposed gripping jaws pivoted on the inner jaws and adapted to be opened and closed to permit the work to be inserted in and removed from the tongs, means for limiting the opening movement of said outer jaws, means carried by said outer jaws for automatically closing them upon insertion of the work within the tongs, and means for releasably locking the outer jaws in their closed position.

6. In a well-casing tongs, the combination of an operating handle, a pair of opposed inner jaws pivoted on the handle and movable towards and away from each other, socketed extensions on said jaws adapted to engage the handle for limiting the movement of the jaws away from each other, springs seated in the socketed extensions and engaging the handle for urging said jaws towards each other, outer opposed jaws pivoted to the inner jaws and adapted to be opened and closed to permit the work to be inserted in and removed from the tongs, means for limiting the opening movement of the outer jaws, and means for releasably locking the outer jaws in their closed position.

7. In a well-casing wrench, the combination of an operating handle, a gripping jaw pivotally mounted on said handle, a second jaw pivoted on the handle having a work gripping surface to one side of its pivotal center and a handle engaging surface on the opposite side of its pivotal center, means interposed between said handle and said handle engaging surface for yieldingly urging the work gripping surface of said jaw towards the other jaw, and means for locking said jaws in engagement with the work.

8. In a well-casing wrench, the combination of an operating handle, a gripping jaw pivoted on said handle, a second jaw pivoted on said handle having a work gripping surface to one side of its pivotal center and a handle engaging surface on the opposite side of its pivotal center, said handle engaging surface having a socket therein, and a spring in said socket engaging the operating handle for yieldingly urging the work gripping surface of said jaw toward the other jaw, and means for latching said jaws in engagement with the work.

ALBERT S. JONES.